3,035,098
METHOD FOR CHLORINATING
ALKYLIDENEBISPHENOLS
Fred Bryner, Midland, Mich., assignor to The Dow Chemical Company, Midland, Mich., a corporation of Delaware
No Drawing. Filed Mar. 12, 1959, Ser. No. 798,850
3 Claims. (Cl. 260—619)

The present invention relates to a new and useful method for chlorinating alkylidenebisphenols and more particularly concerns a novel process by which substantially colorless high purity bis(dichlorophenols) can be obtained.

The known prior art methods for chlorinating alkylidenebisphenols, for example, p,p'-isopropylidenediphenol, employed ethylene dichloride as the reaction solvent. The product was separated and then crysallized from glacial acetic acid. It had a melting point of 127° C. and was produced in yields of 59.6%. In another method, a ferric chloride or aluminum chloride catalyst was employed to produce a product having a higher melting point, viz. 133° C. These processes produce products in low yields which require additional purification resulting in lower yields of desirable salable produce.

It has now been found that when the chlorination of a bisphenol is conducted in the presence of perchloroethylene as the reaction medium, a substantially pure alkylidenebis(dichlorophenol) product is produced having a good melting point. The products are produced in yields of about 80%. In a continuous process, i.e., recycling of the mother liquors from the filtration, the yield is appreciably increased with no detrimental side-product coloration. Good results are obtained when the reaction is carried out at a temperature of between about 40° and about 70° C. and when a molar ratio of from 4 to 4.5 moles of chlorine per mole of bisphenol is employed. The chlorination is conducted such that the addition of the chlorine is completed in from 1 to 30 hours and preferably in from 1–10 hours.

Substantially any p,p'-alkylene- or alkylidene-bisphenol can be tetrachlorinated by the procedure of the present invention. Thus, one can employ either pure or technical grade p,p'-isopropylidenediphenol, p,p'-sec.-butylidenediphenol, p,p'-cyclohexylidenediphenol, p,p'-methylenediphenol, p,p'-ethylenediphenol, p,p'-trimethylenediphenol and the like.

The molar ratio of chlorine to diphenol is from 4 to 4.5 and preferably 4.1 to 4.3.

The following examples are illustrative of the present invention but are not to be construed as limiting.

Example 1

Substantially pure p,p'-isopropylidenediphenol, 228.2 g. (1 mole); (F.P. 157.4° C.), was mixed with 600 ml. of perchloroethylene and warmed under agitation to 62° C. Chlorine, 292 g. (4.12 moles) was added below the surface of the slurry with good stirring and cooling at 60–65° C. over a 4.5 hour period. Hydrochloric acid gas liberated by the reaction was run to a scrubber and absorbed in water. Upon completion of the addition of chlorine the reaction mixture was maintained at about 60° C. for an additional 20 minutes after which it was purged with nitrogen for 30 minutes to remove most of the residual acid and unreacted chlorine. Following the purge with nitrogen, the batch was transferred to a beaker where it was stirred while cooling to 25° C.

The crystals which formed on cooling were removed on a Büchner funnel at 25° C. and washed three times with 50 ml. portions of perchloroethylene, saving the combined mother liquor and wash liquor for recycling in the process. Following the perchloroethylene wash, the crystals were washed on the filter four times with 100 ml. portions of deionized water and the crystals then dried. 293 grams of an off-white (slightly yellow) 4,4'-isopropylidenebis(2,6-dichlorophenol) product having a melting point of 134–135° C. was obtained. This is an 80.1% yield without recycle.

Example 2

Technical grade p,p'-isopropylidenediphenol, 228.2 g. (1 mole), M.P. 151.3–155° C., was mixed with 600 ml. of perchloroethylene and warmed under agitation to 60° C. Chlorine, 292 g. (4.12 moles) was added below the surface of the slurry over a 3.85 hour period with stirring and cooling at 60–65° C. Hydrogen chloride liberated by the reaction was passed to a scrubber and absorbed in water. After all of the chlorine had been added and the reaction mixture allowed to stand for 20 minutes, nitrogen was blown through the batch for 30 minutes at 60° C. to remove the residual acid. Following the purge with nitrogen the batch was cooled to 25° C. and the crystals which formed removed by filtration on a Büchner funnel, washed twice on the filter with 50 ml. portions of perchloroethylene followed by four washes with 100 ml. portions of deionized water and then dried. 267 grams of an off-white (slightly yellow) 4,4'-isopropylidenebis(2,6-dichlorophenol) product having a melting point of 134–135° C. was obtained.

Example 3

The mother liquor (645 ml.) from Example 1 was recycled seven times in chlorinating p,p'-isopropylidenediphenol. In each recycle 228.2 g. (1 mole) of p,p'-isopropylidenediphenol, M.P. 151.3–155° C., was chlorinated at 60–65° C. Procedure was the same as described under Example 1. Conditions and results of the seven recycles are given in the following table:

| Recycle No. | Moles Cl₂ | Reaction Time (hr.) | Yield Percent | M.P., ° C. | Color of Product |
|---|---|---|---|---|---|
| 1 | 4.12 | 2.8 | 80.2 | 131–133 | light yellow. |
| 2 | 4.3 | 5.1 | 93.6 | 133–134 | very lt. yellow |
| 3 | 4.23 | 6.6 | 80.0 | 132–133.5 | Do. |
| 4 | 4.23 | 8.5 | 90.5 | 132–133.5 | Do. |
| 5 | 4.23 | 6.25 | 102.6 | 132–133.5 | Do. |
| 6 | 4.23 | 6.1 | 72.2 | 130–132 | yellow. |
|   |      |     | 5.2  | 131–133 | yellow (2nd. crop). |
| 7 | 4.2 | 5.6 | 90.0 | 131–133 | lt. yellow. |

Average yield for the seven recycles was 87.7%.

Examples 4–6

Temperature affected both the color and the melting point of the product when p,p'-isopropylidenediphenol, 228.2 g. (1 mole), M.P. 152–155° C., was chlorinated in 600 ml. of perchloroethylene with 292 g. (4.12 moles) of chlorine. When the chlorination was run at below 30° C., the color of the product was good but the melting point was low. Chlorination at above 65° C. caused an increased amount of color in the product. The three runs in the following table show the effect of temperature.

| Ex. No. | Temp., ° C. | Time (hrs.) | Yield Percent | M.P. (° C.) | Color of Product |
|---|---|---|---|---|---|
| 4 | 20–30 | 5.16 | 82 | 125–129 | slightly yellow. |
| 5 | 60–65 | 4.9 | 80.7 | 133–134 | Do. |
| 6 | 80–87 | 7.75 | 76.5 | 133–134 | yellow. |

Example 7

Use of solvents other than perchloroethylene used in the chlorination of p,p'-isopropylidenediphenol to 4,4'-isopropylidenebis(2,6-dichlorophenol) yielded a low-melting product, generally in low yield. Runs using other solvents are shown in the following table:

| Solvent | | Reactants, Moles | | Temp., °C. | Time (hr.) | Yield percent | M.P., °C. | Color of Product |
|---|---|---|---|---|---|---|---|---|
| Kind | Vol. ml. | Bisphenol A | Cl₂ | | | | | |
| CCl₄ [1] | 600 | 1 | 4.12 | 50–55 | 10.7 | 59.2 | 124–127 | sl. yellow—gave cloudy melt. |
| CH₃CCl₃ [2] | 600 | 1 | 4.12 | 22.30 | 4.08 | 57.7 | 133.5–134.5 | sl. yellow. |
| Methanol 60% by vol. in water | 530 | 1 | 4.1 | 22–35 | 2.83 | 94.8 | 97–112 | bright yellow. |
| Chlorobenzene | 300 | 1 | 4.14 | 52–65 | 1.5 | 64 | 131.5–132.5 | tan. |
| Pet. ether (86–100) | 700 | 1 | 4.12 | 60–65 | 2.95 | 83.2 | 126–129.5 | sl. yellow. |
| Propylenedichloride | 2,400 | 6 | 24.254 | 20–28 | 7 | 62.5 | 127.5–129.5 | cream color. |
| Ethylenedichloride | 2,000 | 5 | 20.056 | 19–21 | 14 | 59.3 | 128.4–131.9 | pink. |

[1] Carbon tetrachloride (55 ml.) was carried from the reactor by the effluent gas.
[2] Methylchloroform (55 ml.) was carried from the reactor by the effluent gas.

Best results have been obtained in the chlorination of p,p′-isopropylidenediphenol to 4,4′-isopropylidenebis(2,6-dichlorophenol) when 600 ml. of perchloroethylene was used per mole of p,p′-isopropylidenediphenol. When less solvent, for example 400 ml., was used the batch became too thick for mixing. This contributed to incomplete chlorination which resulted in low-melting product in low yield. Furthermore, extreme difficulty was experienced in removing the batch from the reactor. By increasing the perchloroethylene from 600 ml. to 800 ml. per mole of diphenol the yield of product was decreased.

I claim:

1. A method for the preparation of bis(dichlorophenols) which comprises reacting by contacting a bisphenol selected from the group having one of the formulas

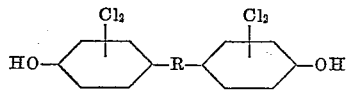

wherein R represents a member selected from the group consisting of a saturated aliphatic bivalent hydrocarbon radical having from 1 to 4 carbon atoms and cyclohexylidene with from 4 to 4.5 moles of chlorine per mole of bisphenol in the presence of from about 400 to 800 ml. of perchloroethylene per mole of bisphenol as a reaction medium and at a temperature of from 20° to 85° C.

2. A method for the preparation of bis(dichlorophenols) which comprises reacting by contacting a bisphenol selected from the group having one of the formulas

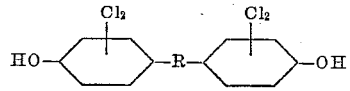

wherein R represents a member selected from the group consisting of a saturated aliphatic bivalent hydrocarbon radical having from 1 to 4 carbon atoms and cyclohexylidene with from 4 to 4.5 moles of chlorine per mole of bisphenol in the presence of from about 400 to 800 ml. of perchloroethylene per mol of bisphenol as a reaction medium and at a temperature of from 40° to 70° C.

3. A method for the preparation of isopropylidene bis(dichlorophenol) which comprises reacting by contacting isopropylidene bisphenol with from 4 to 4.5 moles of chlorine per mole of bisphenol in the presence of from about 400 to 800 ml. of perchloroethylene per mol of bisphenol as a reaction medium and at a temperature of from 40° to 70° C. and recovering by filtering from the reaction medium a substantially pure isopropylidene bis(2,6-dichlorophenol).

References Cited in the file of this patent
UNITED STATES PATENTS
2,254,904    Moss _____ Sept. 2, 1941

UNITED STATES PATENT OFFICE
CERTIFICATE OF CORRECTION

Patent No. 3,035,098                            May 15, 1962

Fred Bryner

It is hereby certified that error appears in the above numbered patent requiring correction and that the said Letters Patent should read as corrected below.

Column 3, lines 35 to 38, and column 4, lines 20 to 23, the formula, each occurrence, should appear as shown below instead of as in the patent:

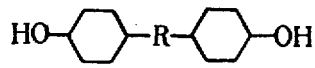

Signed and sealed this 13th day of November 1962.

SEAL)
test:

:RNEST W. SWIDER
  testing Officer

DAVID L. LADD
                                                     Commissioner of Patents